United States Patent [19]

Chung

[11] Patent Number: 5,383,142

[45] Date of Patent: Jan. 17, 1995

[54] FAST CIRCUIT AND METHOD FOR DETECTING PREDETERMINED BIT PATTERNS

[75] Inventor: Shine Chung, San Jose, Calif.

[73] Assignee: Hewlett-Packard Company, Palo Alto, Calif.

[21] Appl. No.: 131,052

[22] Filed: Oct. 1, 1993

[51] Int. Cl.$^6$ .............................................. G06F 5/01
[52] U.S. Cl. ......................... 364/715.11; 364/715.04; 364/715.1
[58] Field of Search ............ 364/715.11, 715.1, 715.04

[56] References Cited

U.S. PATENT DOCUMENTS

| | | | |
|---|---|---|---|
| 4,785,421 | 11/1988 | Takahashi et al. | 364/715.04 |
| 4,864,527 | 9/1989 | Peng et al. | 364/748 |
| 4,939,683 | 7/1990 | van Heerden et al. | 364/715.11 |
| 5,073,864 | 12/1991 | Methvin et al. | 364/715.11 |
| 5,111,415 | 5/1992 | Shackleford | 364/715.04 |
| 5,212,699 | 5/1993 | Morita | 364/715.11 |

OTHER PUBLICATIONS

Richard E. Ladner and Michael J. Fischer, "Parallel Prefix Computation", Journal of the Association for Computing Machinery, vol. 27, No. 4, Oct. 1980.

V. G. Oklobdzija, "Algorithmic Design of a Hierarchical and Modulator Leading Zero Detector Circuit", Electronic Letters 4 Feb. 1993, vol. 29, No. 3.

Belle Wei, Ph.D. Thesis, University of California, Berkeley, EECS Department, 1987, pp. 4-11.

*Primary Examiner*—David H. Malzahn

[57] ABSTRACT

A method and processor design for detecting a specified bit pattern based on the contents of one or more registers, each register having a plurality of bits. The invention is well suited for parallel processing. The method begins by combining successive sets of contiguous bits to generate a state value and output value representative of the values in each set of contiguous bits. The state values and output values so generated become the values for level 1 of a hierarchy of state and output values. The manner in which the states are assigned and the number of states will, in general, depend on the specific bit pattern being sought. At each successive level in the hierarchy, sets of continuous output values and state values from the previous level are combined to generate the output values and state values for the level in question. The number of output and state values is reduced by at least a factor of two at each level of the hierarchy. The process is terminated when only one output value and state value remains. The final output value specifies the location of the first bit of the bit pattern sought in the original bit string when the final state indicates that the bit pattern has been found. The method may be implement by a processor that includes a hierarchical array of processing elements arranged as a plurality of ordered levels of processors. Each level of processors has one or more processing modules. Each processing module receives a plurality of state inputs and generates therefrom a state output. The processing modules in level 1 have their state inputs connected to selected bits in the registers and the processing modules in the $k^{th}$ level of the hierarchy have their state inputs connected to state outputs of processing modules in level (k−1).

13 Claims, 3 Drawing Sheets

FAST CIRCUIT AND METHOD FOR DETECTING PREDETERMINED BIT PATTERNS

FIELD OF THE INVENTION

The present invention relates to computing hardware, and more particularly, to a circuit and method for providing the location of a predetermined bit pattern in a bit-string.

BACKGROUND OF THE INVENTION

Detecting certain bit patterns in a bit-string alone or as a result of an operation of two bit-strings is very important in applications such as computer arithmetic hardware design. For example, leading one detection circuits are widely used in computational hardware. In a floating point adder, the location of the first one is needed to properly normalize the result after the addition. In parallel computing systems such as content addressable memories, a task is presented to a large number of processors, each working on a different data set. For the purposes of this discussion, the term parallel processors denotes any hardware system in which a plurality of identical processors operates on a data set. The processors may be general purpose computers or relatively simple circuits. Some of the processors will have results to report back at the end of the computations. To avoid the problems of multiple processors reporting at the same time, each processor is connected to a bit in a register. Those processors wishing to report a result set the register bit to a one. The system then gives control to the processor having the first one in the register. When this processor is finished, it resets its bit. The system then searches for the next one in the register, and the process is repeated. In each of these applications, a register having G bits must be examined to determine the location of the first one relative to one end of the register.

Prior art attempts to solve this problem are computationally slow. In general, the prior art schemes require a time of order G gate delays to determine the location of the leading one in a register.

Another example of a bit pattern detection problem is that of finding the number of leading zeros when two bit-strings are added. This problem is encountered in floating point hardware.

Broadly, it is the object of the present invention to provide an improved circuit and method for detecting predetermined bit patterns.

It is another object of the present invention to identify the location of a bit pattern found within a bit string.

It is a further object of the present invention to provide a detector that can provide an answer in less than O(G) gate delays.

It is yet another object of the present invention to provide an improved circuit for determining the number of trailing zeros in a bit string.

These and other objects of the present invention will become apparent to those skilled in the art from the following detailed description of the invention and the accompanying drawings.

SUMMARY OF THE INVENTION

The present invention is a method and processor design for detecting a specified bit pattern in a bit string based on the contents of one or more registers, each register having a plurality of bits. The invention is well suited for parallel processing. The method begins by combining successive sets of contiguous bits to generate a state value and output value representative of the values in each set of contiguous bits. The state values and output values so generated become the values for level 1 of a hierarchy of state and output values. The manner in which the states are assigned and the number of states will, in general, depend on the specific bit pattern being sought. At each successive level in the hierarchy, sets of continuous output values and state values from the previous level are combined to generate the output values and state values for the level in question. The number of output and state values is reduced by at least a factor of two at each level of the hierarchy. The process is terminated when only one output value and state value remains. The final output value specifies the location of the first bit of the bit pattern sought in the original bit string, provided the final state value indicates that the bit pattern has been found.

A parallel processing embodiment of the present invention which detects a specified bit pattern includes a hierarchical array of processing elements, comprising a plurality of ordered levels of processors. For convenience, the processor levels are labeled 1, 2, ... M. Each level of processors has one or more processing modules. Each processing module receives a plurality of state inputs and generates therefrom a state output. The processing modules in level 1 have their state inputs connected to selected bits in the registers and the processing modules in the $k^{th}$ level of the hierarchy have their state inputs connected to state outputs of processing modules in level (k−1). In one embodiment of the present invention, the processing modules in levels labeled with 2, 3, . . . , M also include means for receiving a plurality of input values and means for generating output information based on the state inputs and the input values. The receiving means of the processing modules in the $k^{th}$ level of the hierarchy have their receiving means connected to the output generating means of processing modules in level (k−1) for k=2 to M. The output information includes information on the location of the specified bit pattern when the pattern is found. Further, each said processing module in the level labeled 1 includes means for generating an output signal based on the selected bits connected thereto.

DETAILED DESCRIPTION OF THE INVENTION

Figure 1:
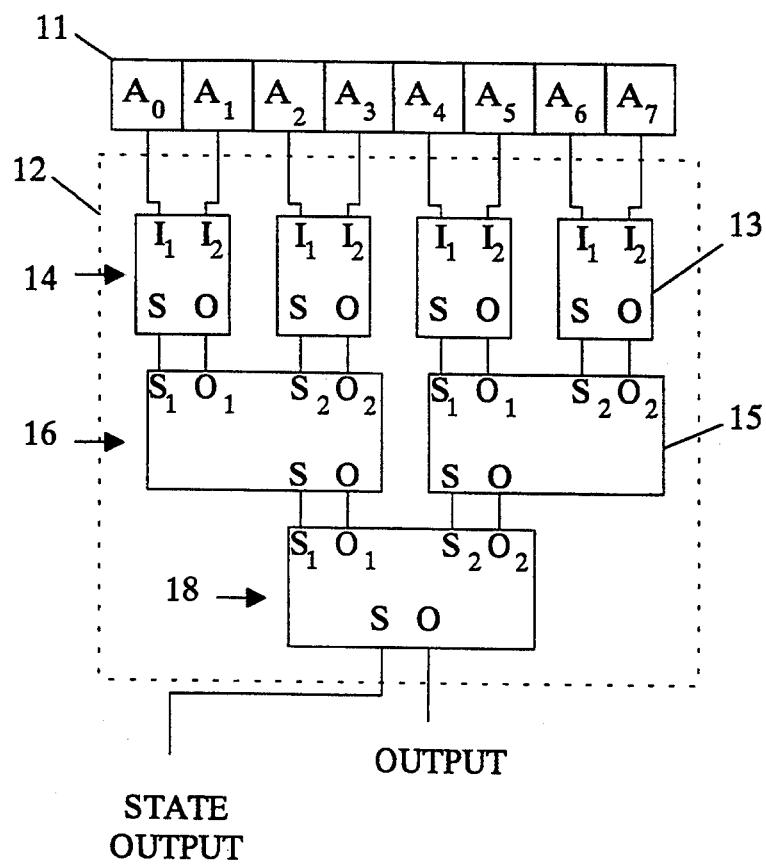
FIG. 1 is a block diagram of a processor according to the present invention for determining the location of the first bit having a one in an 8-bit register.
Figure 2:
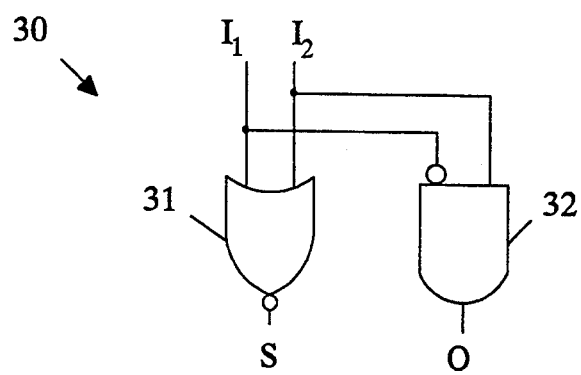
FIG. 2 is a schematic drawing of an initial stage processing module according to the present invention.

The present invention provides a result in a time of order $\log_2(G)$. The manner in which the present invention achieves its advantages may be more easily understood with reference to a simple processor 12 for determining the leading one in an 8-bit register 11 from $A_0$ to $A_7$ as shown in FIG. 1. Detection of a leading one is equivalent to finding the first occurrence of the bit sequence "1". Processor 12 comprises a hierarchical array of processing modules. These levels may be labeled from 1 to M. The first level of processing modules is shown at 14 and is constructed from modules 13 which will be referred to as initial stage modules. An exemplary embodiment of an initial stage processing unit 30 is shown in FIG. 2. Initial stage processing unit 30 is constructed from gates 31 and 32 and provides the outputs described below.

The remaining levels are shown at 16 and 18 and are constructed from state processing modules. An exemplary state processing module is shown at 15. The inputs to the processing modules in level k are connected to the outputs of two processing modules in level (k−1).

Each initial stage module is connected to two cells of register 11. Each initial stage module generates a state variable which is output at the S output of the initial stage module and a partial address output that is output at the O output of the initial stage module. The state variable may have one of three values, L, F, or X. The partial address outputs are either 0 or 1. The outputs of each initial stage module are as follows:

TABLE I

| Outputs for Initial Stage Modules | | |
|---|---|---|
| $A_kA_{k+1}$ | State | Partial Address |
| 00 | L | 0 |
| 01 | F | 1 |
| 10 | X | 0 |
| 11 | X | 0 |

The L state indicates that the desired state has not been found in the two bit sequence. The F state indicates that the desired sequence is contained in the two bit sequence. The X state indicates that the desired sequence is to the left of the two bit sequence or made up of part of this two bit sequence and part of the previous two bit sequence.

Each state processing module also generates a state output and a partial address output. Each state processing module is connected to two modules in the level above it. The first level state processing modules are connected to the initial stage modules. The remaining state processing modules are connected to other state processing modules. Each state processing module accepts two state variables and two partial addresses as inputs. The state processing modules then generate a new state output variable and a new partial address by appending either a 1 or a 0 to one of the partial address input to the state processing module. The mapping implemented by each state processing module scanning from $S_1$ to $S_2$ to find the first occurrence of one is as follows:

TABLE II

| Outputs for State Processing Modules | | | | |
|---|---|---|---|---|
| | | | $S_2(O_2)$ | |
| | | $L(O_2)$ | $F(O_2)$ | $X(O_2)$ |
| $S_1(O_1)$ | $L(O_1)$ | $L(1O_2)$ | $F(1O_2)$ | $F(1O_2)$ |
| | $F(O_1)$ | $X(00_1)$ | $X(00_1)$ | $X(00_1)$ |
| | $X(O_1)$ | $X(00_1)$ | $X(00_1)$ | $X(00_1)$ |

The manner in which Tables I and II are applied may be more easily understood with reference to the concrete example which is summarized in Table III below: The Level 1 outputs are taken from Table I above. The Level 2 and Level 3 outputs are taken from Table II. In general, a first state $S_1$ is either F or X indicates that the bit pattern has been found; hence, the new state is X regardless of state $S_2$. On the other hand, if the first state $S_1$ is L, then the pattern has not been found; hence, the new state will depend on state $S_2$. For example, in combining X(0) and F(1), the state processing module appended a 0 to the partial address shown associated with the first input, i.e., the input shown under A5, and generated a new state of X. The final state processing module combined the L(10) and X(00) by appending a 1 to the partial address of the second input to obtain the output address of 100 in binary. The output selection is performed as follows. Suppose the pattern is being sought in the direction from $S_1$ to $S_2$. If the pattern is found either in $S_1$ or before $S_1$, the output is "0" appended to the output of $S_1$ which is $O_1$, otherwise the output is "1" appended to the partial output of $S_2$, i.e., $O_2$.

| Reg. | $A_0$ 0 | $A_1$ 0 | $A_2$ 0 | $A_3$ 0 | $A_4$ 1 | $A_5$ 1 | $A_6$ 0 | $A_7$ 1 |
|---|---|---|---|---|---|---|---|---|
| Level 1 | | L(0) | | L(0) | | X(0) | | F(1) |
| Level 2 | | | | L(10) | | | | X(00) |
| Level 3 | | | | | | | | F(100) |

It will be apparent to those skilled in the art that the number of levels in a leading one detector according to the present invention is of order $\log_2(G)$. The processors in each level all work in parallel. The time delay in processing the information at each level will be proportional to the number of gate delays in each level times $\log_2(G)$. Hence, the present invention provides the answer in a time of order $\log_2(G)$.

It will be apparent from an examination of Tables I and II that the number of states can be reduced from 3 to 2. If the states F and X are replaced by Q, then Table I becomes

TABLE III

| Outputs for Initial Stage Modules | | |
|---|---|---|
| $A_kA_{k+1}$ | State | Partial Address |
| 00 | L | 0 |
| 01 | Q | 1 |
| 10 | Q | 0 |
| 11 | Q | 0 | and Table II becomes

TABLE IV

| Outputs for State Processing Modules | | | |
|---|---|---|---|
| | | $S_2(O_2)$ | |
| | | L | Q |
| $S_1(O_1)$ | L | $L(1O_2)$ | $Q(1O_2)$ |
| | Q | $Q(00_1)$ | $Q(00_1)$ |

Figure 3:
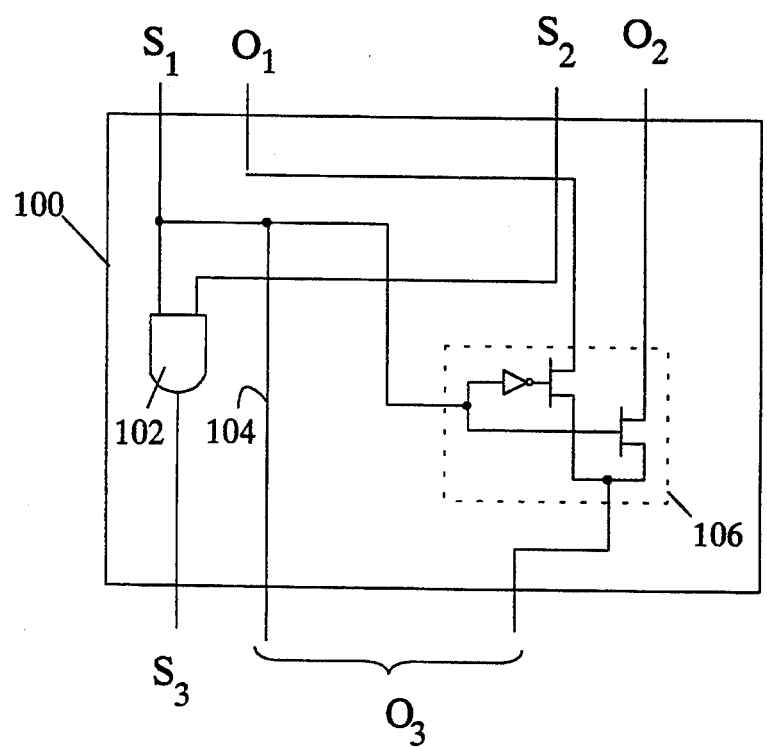
FIG. 3 is a block diagram of a hardware embodiment of a state processing module according to the present invention for use in the processor shown in FIG. 1.

This simplification leads to a simple hardware embodiment for the state processing modules. A hardware embodiment of a state processing module is shown in FIG. 3 at 100. It will be assumed that state L is represented by a logical 1 and state Q is represented by a logical 0. AND gate 102 then computes the output state $S_3$. The output value has two components, the appended bit 104, and one of the previous partial addresses. The previous partial address is selected by multiplexer 106 which selects $O_2$ if $S_1$ is a logical 1. Those skilled in the art will recognize that the state processing module can be implemented in other ways than the embodiment shown in FIG. 3. If the final state is Q, the pattern was found in the bit-string, and the output is the location of the pattern; otherwise, the pattern was not found.

The above-described embodiments of the present invention examined two bit sequences. It will be apparent to those skilled in the art that embodiments that provide the address of the first occurrence of a P bit sequence can be constructed in an analogous manner. In this case, each initial stage module would be connected to P bits in the register. For the sake of simplicity, it will be assumed that $P=2^q$. In this case, the output value of the initial stage module would be a q-bit number. Each state processing module would accept 2 state signals and partial address values from the processing modules in the previous level. Each state processing module would generate a new state signal, select one of the partial address values to be augmented to produce the partial address to be sent to the next level. Each state processing module would augmented the partial address by one bit which depends on the pattern of state input signals to the state processing module. The number of distinct state values will depend on the specific pattern being sought. In general, this will be a number between 2 and $2^q$. The specific mapping tables for propagating the states will also, in general, depend on the specific sequence being sought.

In the more general case, the present invention attaches certain state information to each bit in a bit-string. The information must be sufficient to fully describe the problem of interest. In general, the number of states will be different for each problem. Each state also has an output value. The initial states and output values are assigned by examining adjacent bits in the bit-string. Each adjacent grouping of N bits generates one state and one output value. In the above example, $N=2$.

The state information and output values are propagated in a hierarchical fashion, with the number of states and output values at each level of the hierarchy decreasing with each level. In the preferred embodiment of the present invention, the number of states and output values decreases by a factor of two at each level. Within a given level in the hierarchy, an adjacent group of bits from the prior level is examined in a plurality of state processing modules. Each state processing module receives the state and output data from a group of adjacent bits in the prior level. The number of bits in the group is preferably equal to P; however, it will be apparent to those skilled in the art that systems based on different values may be constructed. Each state processing module generates a new state and output value.

While the above embodiments of the present invention have utilized groupings of two bits, it will be apparent to those skilled in the art that other groupings may be utilized for obtaining the states and outputs of the first level of the hierarchy. In the preferred embodiment of the present invention, the number of bits grouped together in the first level is greater than the length of the bit string being sought. In particular, it is preferred that the group be a power of the next power of two that is greater than the length of the sought bit string. Similarly, the propagation of the states and outputs through the hierarchy may utilized groupings of outputs from the previous level that are greater than two. However, in the preferred embodiment of the present invention, the groupings after the first level are always two, as this provides the simplest implementation.

Figure 4:
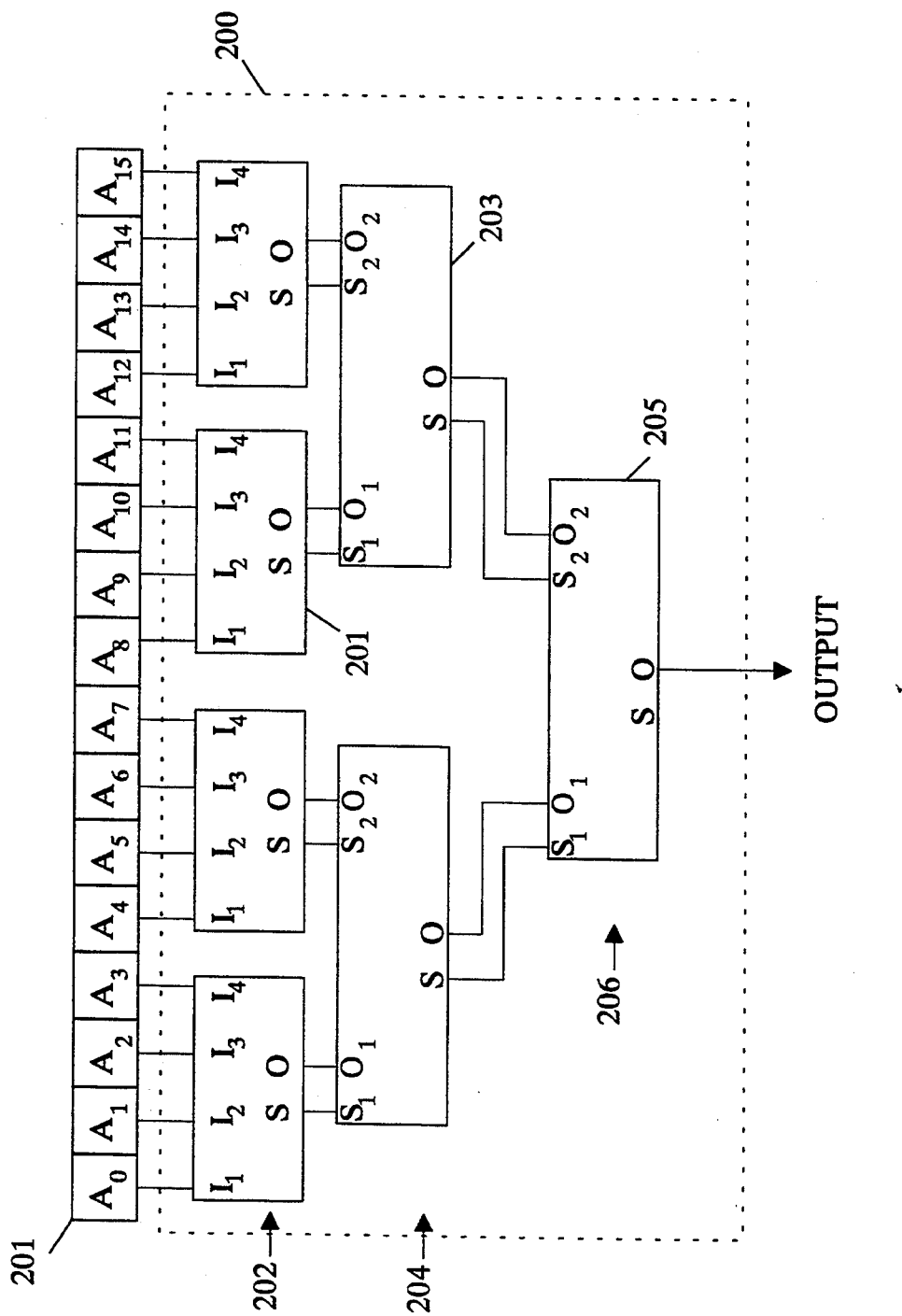
FIG. 4 is a block diagram of a processor according to the present invention for determining the location of a predetermined three bit sequence in a 16-bit register.

FIG. 4 is a block diagram of a processor 200 for detecting a predetermined three or four bit sequence in a register 201. Processor 200 comprises a hierarchical array of processing modules. The first level of processing modules is shown at 202 and is constructed from initial stage modules 201. Each initial stage module is connected to four bits of register 201. The remaining levels are shown at 202 and 204 and are constructed from state processing modules of which state processing modules 203 and 205 are typical. Each state processing module is connected to the outputs of two modules in the level above it.

Consider the case in which a detector for finding the first occurrence of the bit pattern "101" is to be constructed. The first level will be generated from processors that examine 4 bits at a time, i.e., the next highest power of two after three. There are a total of 16 possible states for a 4 bit quartet. However, the total number of states needed to implement a processor are less than 16, since some of the states are equivalent to one another. For example, the states corresponding to the bit patterns "0001" and "0011" belong to the same state, since the only way that these bit patterns can be part of the sought pattern is if the next quartet has the same value, i.e., "01xx" where x is any bit value. Similarly, the bit patterns "1010" and "1011" are equivalent, since the sought pattern starts in the same position in each pattern. This type of analysis leads to the observation that there are 11 states for the output states of the first level of processors. These states are summarized in Table VI, below.

The output value provided by each of the first level processors corresponds to the position in the quartet of the first bit of the desired pattern in the case in which the quartet in question or this quartet and the one following it contain the sought sequence. The output value generated by each of the first level processors is also shown in Table VI. The output value associated with each state is the position of the bit that can produce a pattern match either inside the bit grouping that generated that state or when paired with the next bit grouping. For example, the output value of the four bit group "0101" is 1 because bit 1 is the starting bit of the pattern "101". The output value of the grouping "0001" is 3, because bit position 3 could be the stating bit of the pattern "101" if the following grouping was of the form "01xx".

TABLE VI

| Outputs for Initial Stage Modules | | | | | | | | |
|---|---|---|---|---|---|---|---|---|
| Bit Pattern | 0000 | 0001 | 0010 | 0011 | 0100 | 0101 | 0110 | 0111 |
| State | S(0000) | S(00X1) | S(0010) | S(00X1) | S(0100) | S(0101) | S(0110) | S(0111) |
| Output Value | 0 | 3 | 2 | 3 | 0 | 1 | 2 | 3 |
| Bit Pattern | 1000 | 1001 | 1010 | 1011 | 1100 | 1101 | 1110 | 1111 |
| State | S(1X00) | S(1111) | S(101X) | S(101X) | S(1X00) | S(101X) | S(1110) | S(1111) |
| Output Value | 0 | 3 | 0 | 0 | 0 | 1 | 2 | 3 |

The state processing modules each connect to a pair of modules in the level above the state processing module in question. Denote this pair of modules by F and B, F being the state module closest to $A_0$ end of register 201. This assumes that the bit pattern is sought from $A_0$ to $A_{15}$, i.e., from F to B. Each state processing module generates a new state variable and an output which consists of one of the inputs to the state processing module to which a bit is appended. Although the specific bit pattern sought is different from the example of searching for the first "1" described above, the output is generated in a similar manner. If a match is found in the F module, a "0" is appended to the partial output of F. If a match is found in the B module, a "1" is appended to the partial output of B. If a match is found on the boundary of F to B, a "0" is appended to F. Finally, if no match is found in F or B, a "1" is appended to the partial output of B. The specific state variable value and output value are determined by the states input to the state processing module. These are summarized in Table VII. An output value of 0B signifies that the value 0 is appended to the output received from the B module. Similarly, a value of 1F signifies that a bit having a value 1 is appended to the output received from the F module. It will also be noted that a new state S(00101) has been defined after the first level. This state results when the states corresponding to "0010" and "1110" are paired.

While the above-described embodiments of the present invention have utilized a plurality of processing modules operating in parallel, it will be apparent to those skilled in the art that the method of the present invention may be applied with the aid of any hardware system which generates first level state and output values from the bits of a bit string and then processes these through a hierarchy of processing levels in which a plurality of the states and outputs generated by a previous level are combined to form the states and outputs of the next level. The process is continued until only one output value is generated.

The above embodiments of the present invention refer to "registers" as the mode of storage for the various bit strings. It will be apparent to those skilled in the art that the bit string may be stored in any form of hardware that allows the first level of processing elements to access it. Hence, the term register is defined to include any means for storing the bit string(s) in which the pattern is sought.

Various modifications to the present invention will become apparent to those skilled in the art from the foregoing description and accompanying drawings. Accordingly, the present invention is to be limited solely by the scope of the following claims.

TABLE VII

| | B Module State | | | | | |
|---|---|---|---|---|---|---|
| | | S(000) | S(00X1) | S(0010) | S(0100) | S(0101) | S(0111) |
| | S(000) | S(000) (1B) | S(00X1) (1B) | S(0010) (1B) | S(0000) (1B) | S(00101) (1B) | S(00X1) (1B) |
| | S(00X1) | S(0000) (1B) | S(00X1) (1B) | S(0010) (1B) | S(00101) (0F) | S(00101) (0F) | S(00101) (0F) |
| | S(0010) | S(0000) (1B) | S(00X1) (1B) | S(0010) (1B) | S(0000) (1B) | S(00101) (1B) | S(00X1) (1B) |
| F | S(0100) | S(0100) (1B) | S(0111) (1B) | S(0110) (1B) | S(0100) (1B) | S(0101) (1B) | S(0111) (1B) |
| Module | S(0101) | S(0101) (0F) | S(0101) (0F) | S(0101) (0F) | S(0101) (0F) | S(0101) (0F) | S(0101) (0F) |
| State | S(0111) | S(0100) (1B) | S(0111) (1B) | S(0110) (1B) | S(0101) (0F) | S(0101) (0F) | S(0101) (0F) |
| | * S(0110) | S(0100) (1B) | S(0111) (1B) | S(0110) (1B) | S(0100) (1B) | S(0101) (1B) | S(0111) (1B) |
| | S(1X00) | S(1X00) (1B) | S(1111) (1B) | S(1110) (1B) | S(1X00) (1B) | S(101X) (1B) | S(1111) (1B) |
| | S(101X) | S(101X) (0F) | S(101X) (0F) | S(101X) (0F) | S(101X) (0F) | S(101X) (0F) | S(101X) (0F) |
| | S(1111) | S(1X00) (1B) | S(1111) (1B) | S(1110) (1B) | S(101X) (0F) | S(101X) (0F) | S(101X) (0F) |
| | S(1110) | S(1X00) (1B) | S(1111) (1B) | S(1110) (1B) | S(1X00) (1B) | S(101X) (1B) | S(1111) (1B) |
| | S(00101) | S(00101) (0F) | S(00101) (0F) | S(00101) (0F) | S(00101) (0F) | S(00101) (0F) | S(00101) (0F) |
| | | S(0110) | S(1X00) | S(101X) | S(1111) | S(1110) | S(00101) |
| | S(000) | S(0010) (1B) | S(0000) (1B) | S(00101) (1B) | S(00X1) (1B) | S(0010) (1B) | S(00101) (1B) |
| | S(00X1) | S(00101) (0F) | S(0000) (1B) | S(00101) (1B) | S(00X1) (1B) | S(0010) (1B) | S(00101) (1B) |
| | S(0010) | S(0010) (1B) | S(00101) (0F) | S(00101) (0F) | S(00101) (0F) | S(00101) (0F) | S(00101) (1B) |
| F | S(0100) | S(0110) (1B) | S(0100) (1B) | S(0101) (1B) | S(0111) (1B) | S(0110) (1B) | S(0101) (1B) |
| Module | S(0101) | S(0101) (0F) | S(0101) (0F) | S(0101) (0F) | S(0101) (0F) | S(0101) (0F) | S(0101) (0F) |
| State | S(0111) | S(0101) (0F) | S(0100) (1B) | S(0101) (1B) | S(0111) (1B) | S(0110) (1B) | S(0101) (1B) |
| | S(0110) | S(0110) (1B) | S(0101) (0F) | S(0101) (0F) | S(0101) (0F) | S(0101) (0F) | S(0101) (1B) |
| | S(1X00) | S(1110) (1B) | S(1X00) (1B) | S(101X) (1B) | S(1111) (1B) | S(1110) (1B) | S(101X) (1B) |
| | S(101X) | S(101X) (0F) | S(101X) (0F) | S(101X) (0F) | S(101X) (0F) | S(101X) (0F) | S(101X) (0F) |
| | S(1111) | S(101X) (0F) | S(1X00) (1B) | S(101X) (1B) | S(1111) (1B) | S(1110) (1B) | S(101X) (1B) |
| | S(1110) | S(1110) (0F) | S(101X) (0F) | S(101X) (0F) | S(101X) (0F) | S(101X) (0F) | S(101X) (1B) |

TABLE VII-continued

| B Module State | | | | | | |
|---|---|---|---|---|---|---|
| S(00101) | S(00101) (0F) | S(00101) (0F) | S(00101) (0F) | S(00101) (0F) | S(00101) (0F) | S(00101) (0F) |

What is claimed is:

1. A processor for detecting a specified bit pattern in the contents of one or more registers, each register having a plurality of bits, said processor comprising a hierarchical array comprising a plurality of ordered levels of processors labeled 1, 2, ... M, each level of processors having one or more processing modules, each processing module receiving a plurality of state inputs and generating therefrom a state output, said processing modules in level 1 of said processors having said state inputs connected to selected bits in said registers and said processing modules in the $k^{th}$ level of said hierarchy having said state inputs connected to state outputs of processing modules in level (k−1) of said hierarchy for k=2 to M, wherein each of said processing modules in said levels labeled with 2, 3, ..., M further comprise means for receiving a plurality of input values and means for generating an output value based on said state inputs and said input values, said receiving means of said processing modules in the $k^{th}$ level of said hierarchy having said receiving means connected to said output generating means of processing modules in level (k−1) of said hierarchy for k=2 to M, said output value providing information on the potential location of said specified bit pattern, and wherein each said processing module in said level labeled 1 includes means for generating an output signal based on said selected bits connected thereto.

2. The processor of claim 1 wherein each of said processing modules in the $p^{th}$ level of said hierarchy, for p>1, has said state inputs connected to state outputs of two processing modules in level (p−1).

3. The processor of claim 2 wherein said processing modules in levels 2, ... M comprise means for receiving first and second state input, each said state input having one of two predetermined values, means for receiving first and second partial addresses, means responsive to said first and second state inputs for generating a state output having one of said two predetermined values, means responsive to said first and second state inputs for selecting one of said partial addresses and for generating an address bit to be appended to one of said partial addresses to form the output information of said processing module.

4. The processor of claim 1 wherein said state output from one of said processing module in said level labeled M in said hierarchical array indicates whether the specified bit pattern has been found, and said output value output from one of said processing module in said level labeled M in said hierarchical array indicates the location of the specified bit pattern in said register.

5. The processor of claim 1 wherein said output value output from each of said processing modules in the $k^{th}$ level comprises an enlarged partial address, and wherein said means for generating said output value comprises means for producing said enlarged partial address by selecting one of said output values input thereto based on said state inputs thereto.

6. The processor of claim 5 wherein said means for generating said output value further comprises means for appending an additional bit to the selected one of said output values input thereto.

7. A method for operating a data processing system to determine the position of a predetermined bit pattern in a string of bits, said method comprising the steps of:
   (a) combining successive sets of contiguous bits in said bit string to generate a state value and output value representative of the values in each said set of contiguous bits, said state values and output values comprising level 1 of a hierarchy of state and output values, each bit in said bit string being in precisely one of said successive sets;
   (b) combining successive sets of continuous output values and state values from level k to generate output values and state values in level (k+1) for k>1, said output values and state values being determined by the output values and state values in level k, each output value and state value in level k being in precisely one of said successive sets, the number of said output values and said state values at level k being less than the number of said output values and state values at level (k−1); and
   (c) repeating (b) until only one output value and one state value are generated, said output value arid said state value being referred to as the final output value and the final state value, respectively.

8. The method of claim 7 wherein said final output value specifies the position of said predetermined bit pattern.

9. The method of claim 8 wherein each output value generated at level k includes at least one of the output values generated at level (k−1).

10. The method of claim 7 in which the number of output and state values generated at any given level is one half the number generated at the previous level.

11. The method of claim 7 wherein said final state output generated in the last level indicates whether the specified bit pattern has been found, and said final output value generated in the last level indicates the location of said predetermined bit pattern.

12. The method of claim 7 wherein said output values generated comprise an enlarged partial address, and wherein said combining step (b) comprises the step of producing said enlarged partial address for level k+1 by selecting one of said output values for level k based on said state inputs.

13. The method of claim 12 wherein said combining step (b) further comprises the step of appending an additional bit to the selected one of said output values.

* * * * *